United States Patent
Ogawa

(10) Patent No.: US 7,258,470 B2
(45) Date of Patent: Aug. 21, 2007

(54) VEHICLE SUN VISORS HAVING LIGHTING DEVICES

(75) Inventor: Hiroto Ogawa, Toyota (JP)

(73) Assignees: Kyowa Sangyo Co., Ltd., Toyota-shi, Aichi-ken (JP); Shinwa Seiko Co., Ltd., Toyota-shi, Aichi-ken (JP)

( * ) Notice: Subject to any disclaimer, the term of this patent is extended or adjusted under 35 U.S.C. 154(b) by 105 days.

(21) Appl. No.: 11/113,860

(22) Filed: Apr. 25, 2005

(65) Prior Publication Data

US 2005/0237756 A1 Oct. 27, 2005

(30) Foreign Application Priority Data

Apr. 27, 2004 (JP) .............................. 2004-131626

(51) Int. Cl.
*B60Q 3/02* (2006.01)

(52) U.S. Cl. ...................... 362/492; 362/136; 362/295

(58) Field of Classification Search ................ 362/492, 362/494, 135, 136, 137, 295, 802, 488
See application file for complete search history.

(56) References Cited

U.S. PATENT DOCUMENTS 4,791,537 A * 12/1988 Fisher et al. ................ 362/135
5,329,430 A * 7/1994 Lanser et al. ............... 362/492
5,438,491 A * 8/1995 White ........................ 362/492
6,076,947 A * 6/2000 Miller ........................ 362/492

FOREIGN PATENT DOCUMENTS

JP          7-276984          10/1995

* cited by examiner

*Primary Examiner*—Ali Alavi
*Assistant Examiner*—Bao Q. Truong
(74) *Attorney, Agent, or Firm*—Conley Rose, P.C.

(57) ABSTRACT

A vehicle sun visor includes a visor body, a mirror mounted to the visor body, and a mirror cover slidably movable relative to the visor body along a reflective surface of the mirror between a closed position substantially covering the reflective surface of the mirror and an opened position for uncovering the reflective surface. A lighting device serves to illuminate a driver or a passenger when the mirror is used. A light control device serves to turn the lighting device from off to on as the mirror cover slides from the closed position to the opened position. The light control device also serves to control the intensity of light emitted from the lighting device in response to the position of the mirror cover.

13 Claims, 10 Drawing Sheets

VEHICLE SUN VISORS HAVING LIGHTING DEVICES

This application claims priority to Japanese patent application serial number 2004-131626, the contents of which are incorporated herein by reference.

BACKGROUND OF THE INVENTION

1. Field of the Invention

The present invention relates to vehicle sun visors having lighting devices in conjunction with mirrors and mirror covers.

2. Description of the Related Art

Conventionally, various types of sun visors are known, such as a sun visor disclosed in Japanese Laid-Open Patent Publication No. 7-276984. The sun visor of this publication has a visor body and a mirror unit associated with the visor body. The mirror unit includes a mirror and a mirror cover that is vertically pivotally mounted to an upper edge of the mirror. The mirror cover can move between an upwardly pivoted position (i.e., an opened position) in order to uncover the reflective surface, and a downwardly pivoted position (i.e., a closed position) in order to cover the reflective surface.

A lighting device is mounted to a surface of the mirror cover. This surface faces a driver or a passenger when the mirror cover is in the opened position. An ON/OFF switch is assembled to a pivotal shaft of the mirror cover. The switch is turned on and off in response to the pivotal movement of the mirror cover. A slide switch is mounted to a side edge of the mirror in order to enable the adjustment of the intensity of the light emitted from the lighting device. In this way, the lighting device may be turned on when the mirror cover has been pivoted upward to the opened position. In addition, the light intensity may be adjusted by operating the slide switch.

However, according to the sun visor disclosed in the above publication, the ON/OFF switch and the slide switch are separately provided. Therefore, the construction of the sun visor is complicated. In addition, the operability is degraded because each of the above switches must be separately operated.

SUMMARY OF THE INVENTION

It is accordingly an object of the present invention to teach vehicle sun visors with lighting devices that are simple in construction and improved in operability.

In one aspect of the present teachings, vehicle sun visors are taught that include a visor body, a mirror mounted to the visor body, and a mirror cover slidably movable relative to the visor body along a reflective surface of the mirror. The mirror cover is movable between a closed position for substantially covering the reflective surface of the mirror and an opened position for uncovering the reflective surface. A lighting device serves to illuminate a driver or a passenger when using the mirror (i.e., the operator of the mirror may be illuminated). A light control device serves to turn the lighting device from off to on as the mirror cover slides from the closed position to the opened position. The light control device also serves to control the intensity of the light emitted from the lighting device in response to the position of the mirror cover.

Therefore, the light control device serves as an ON/OFF switch for the lighting device and also serves as a control switch for controlling the intensity of light emitted from the lighting device. As a result, the sun visor may have a simple construction while having the same functionality as dual independent switches.

In addition, the switching operation between on and off of the lighting device and the operation for varying the light intensity can be continuously performed by simply slidably moving the mirror cover. As a result, the sun visor is improved in operability because no separate operation is required for performing these functions.

The lighting device may be positioned at any position, for example, such as the visor body or the vehicle cabin ceiling, as long as the lighting device can emit light towards the driver or the passenger (i.e., the operator who is typically the user of the mirror).

In one embodiment, the light control device includes a pair of body electrodes mounted to the visor body and a cover electrode mounted to the mirror cover. The light control device is configured as a variable resistor and is operable to short-circuit (i.e., electrically connect) the body electrodes by contact with the cover electrode in response to the movement of the cover electrode. The cover electrode moves together with the sliding mirror cover. The electrical resistance value varies as the cover electrode slides along the body electrodes while the cover electrode establishes an electrical connection between the body electrodes.

With this arrangement, the lighting device may have a simple construction, because the light control device is configured as a variable resistor having a pair of body electrodes and a cover electrode that moves together with the mirror cover.

In another embodiment, at least one rail provides a guide for the sliding movement of the mirror cover. In addition, the body electrodes are mounted to the at least one rail. Therefore, as the mirror cover slides along the at least one rail, the cover electrode mounted to the mirror cover moves relative to the body electrodes mounted to the rail. As a result, the cover electrode can reliably electrically connect the body electrodes.

In a further embodiment, a positioning device is disposed between the mirror cover and the visor body. The positioning device enables the sliding position of the visor cover to be selectively set to one of a plurality of set positions. The intensity of the light emitted from the lighting device can then be maintained to have a value corresponding to the desired one of the selected set positions. Positioning the mirror via the positioning device can easily set the light intensity of the lighting device. In addition, the positioning device can reliably maintain this set position. As a result, there is an improvement in the operability of the lighting device.

DETAILED DESCRIPTION OF THE INVENTION

Each of the additional features and teachings disclosed above and below may be utilized separately or in conjunction with other features and teachings to provide improved vehicle sun visors and methods of manufacturing such sun visors. Representative examples of the present invention, which examples utilize many of these additional features and teachings both separately and in conjunction with one another, will now be described in detail with reference to the attached drawings. This detailed description is merely intended to teach a person of skill in the art further details for practicing preferred aspects of the present teachings and is not intended to limit the scope of the invention. Only the claims define the scope of the claimed invention. Therefore, combinations of features and steps disclosed in the following detailed description may not be necessary to practice the invention in the broadest sense, and are instead taught merely to particularly describe representative examples of the invention. Moreover, various features of the representative examples and the dependent claims may be combined in ways that are not specifically enumerated in order to provide additional useful embodiments of the present teachings.

FIRST REPRESENTATIVE EMBODIMENT

Figure 1:
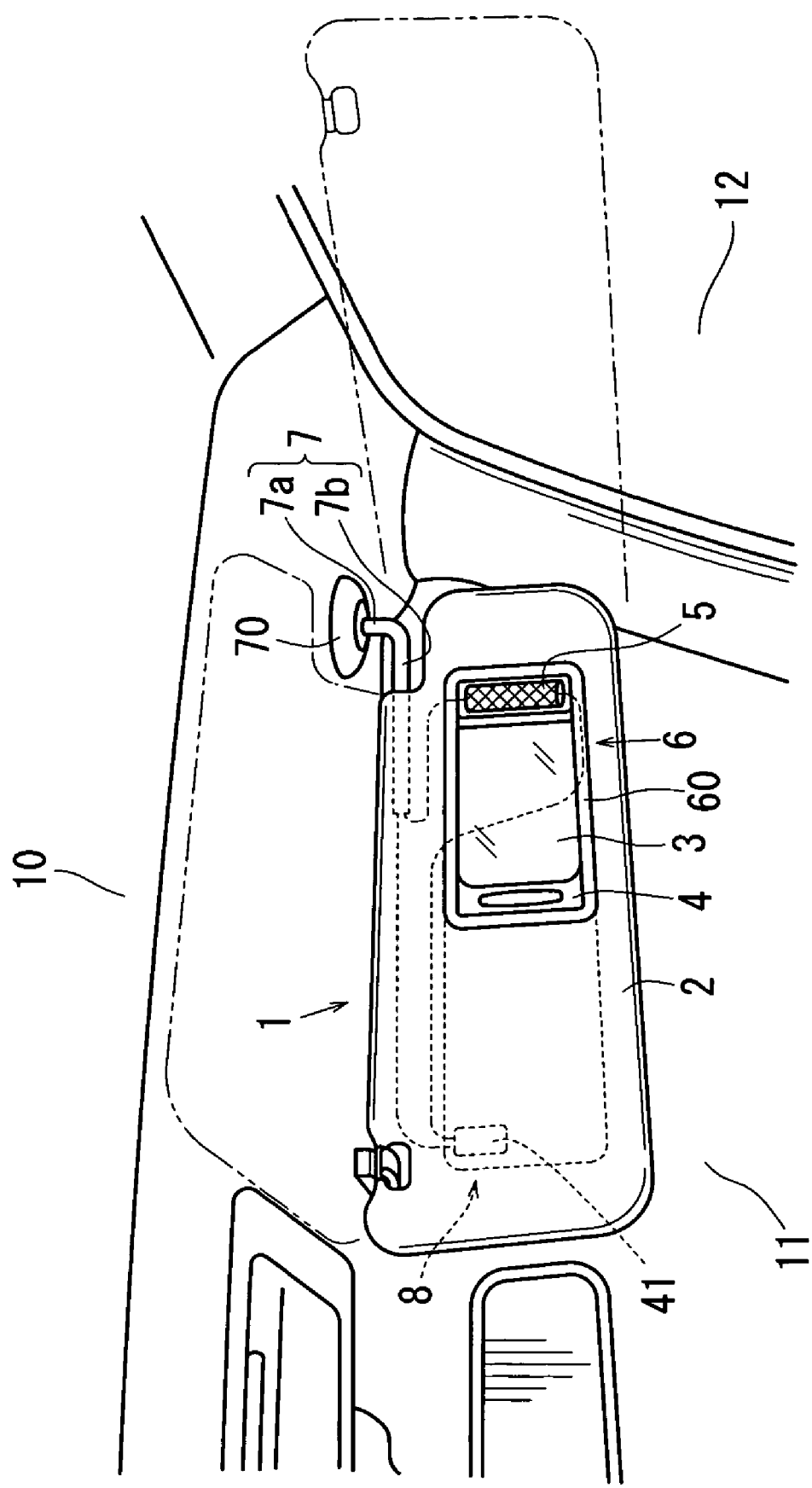
FIG. 1 is a perspective view of a vehicle sun visor according to a first representative embodiment of the present invention and showing the state where a visor body is mounted to a vehicle cabin ceiling.

A first representative embodiment of the present invention will now be described with reference to FIGS. 1 to 10. Referring to FIG. 1, a vehicle sun visor 1 generally includes a rectangular plate-shaped visor body 2, a support rod 7 for supporting the visor body 2, and a bracket 70 for mounting the support rod 7 to a vehicle cabin ceiling 10. A mirror unit 6 is attached on one of the opposing side surfaces of the visor body 2. A lighting device 5 may be mounted on the mirror unit 6.

The support rod 7 has a substantially L-shaped configuration and includes a vertical rod portion 7a and a horizontal rod portion 7b. The horizontal rod portion 7b is inserted into the visor body 2 in a position adjacent to the upper edge of the visor body 2. The horizontal rod portion 7b pivotally supports the visor body 2 about an axis of the horizontal rod portion 7b. The vertical rod portion 7a is rotatably mounted to the vehicle cabin ceiling 10 via the bracket 70.

Therefore, as the visor body 2 pivots about the axis of the horizontal rod portion 7b or the support rod 7, the visor body 2 may move between a storage position along the vehicle cabin ceiling 2 and a light shielding position along a windshield 11 (hereinafter also called a "front light shielding position"). In addition, as the visor body 2 pivots about the axis of the vertical rod portion 7a, the visor body 2 may move between the front light shielding position and another light shielding position along a side window 12 (hereinafter also called a "side light shielding position").

The visor body 2 has a hollow plate-shaped configuration. The visor body 2 is constituted by two shells, 2a and 2b, that are lapped or joined with each other in the direction of thickness and are then bonded to one another. The outer surfaces of the lapped shells 2a and 2b may be covered with an outer cover material (not shown).

Figure 3:
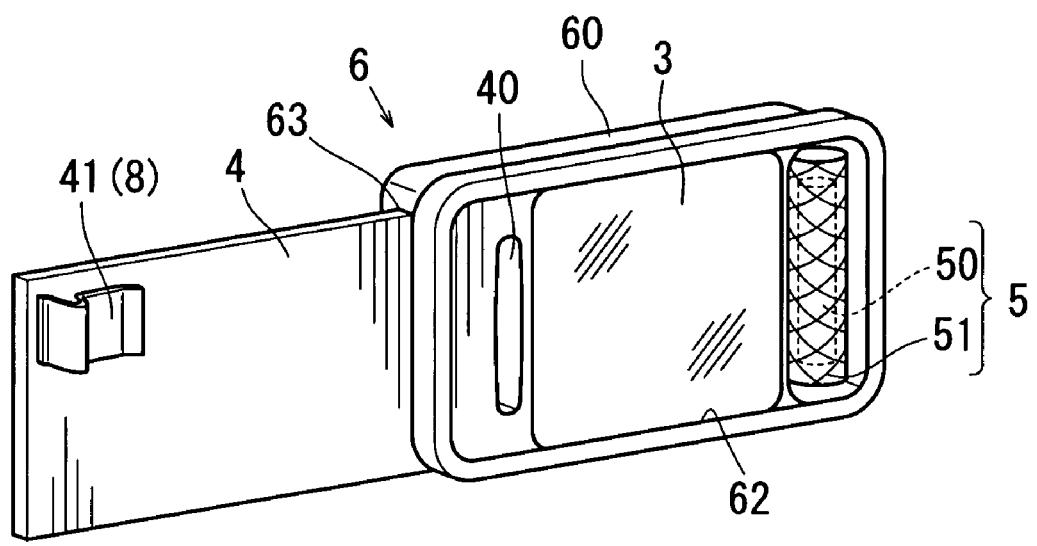
FIG. 3 is a front perspective view of a mirror unit of the sun visor.

As shown in FIG. 3, the mirror unit 6 has a holder 60, a mirror 3, and a mirror cover 4, in addition to the lighting device 5. The mirror 3 and the lighting device 5 are fixedly mounted to the holder 60. The mirror cover 4 is slidably mounted to the holder 60 as will be explained later. The holder 60 has a central opening 62 through which a reflective surface of the mirror 3 is exposed to the outside. In addition, a side opening 63 is formed on a lateral side (i.e., the left side in this representative embodiment) of the holder 60. The mirror cover 4 can slide in right and left directions relative to the holder 60 so as to move into and out of the holder 60. The mirror cover 4 may move between a closed position for covering the reflective surface of the mirror 3 and an opened position exposing the reflective surface of the mirror 3.

The lighting device 5 is adapted to illuminate the driver or the passenger during the use of the mirror 3. As shown in FIG. 3, the lighting device 5 has a lamp 50 (e.g., an electric bulb) and a cover 51 for covering the lamp 50. The lighting device 5 is fixedly mounted to one of the side portions (e.g., the right side portion in this representative embodiment) of the holder 60. Therefore, the mirror cover 4 may cover the lighting device 5 when the mirror cover 4 is in the closed position. Conversely, the mirror cover 4 may uncover the lighting device 5 when the mirror cover 4 is in the opened position.

Figure 2:
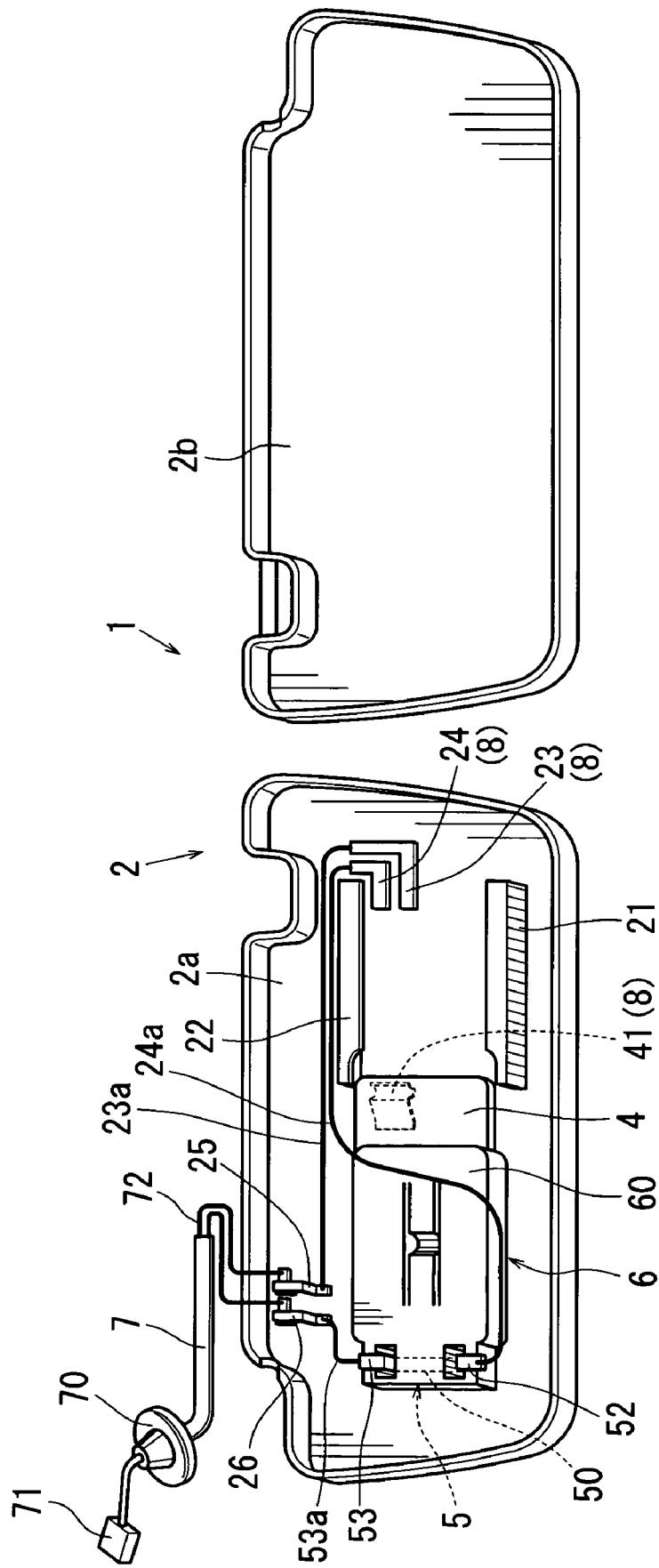
FIG. 2 is an exploded perspective view of the sun visor and showing the pair of shells of the visor body and a support rod.
Figure 6:
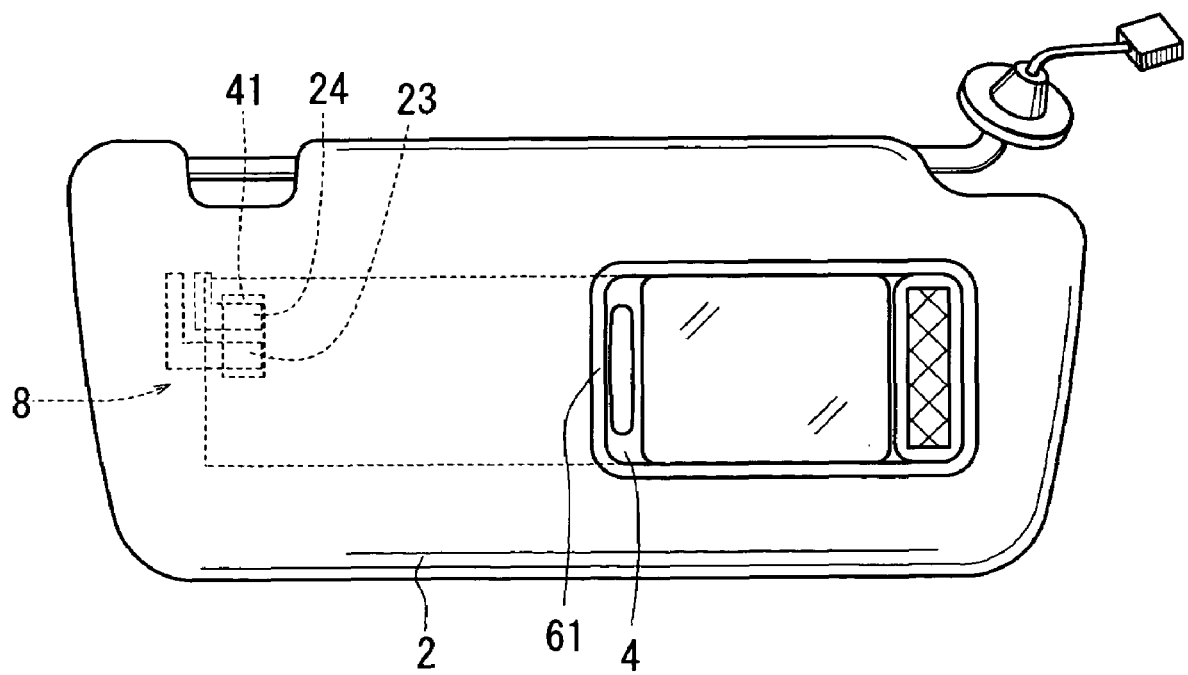

As shown in FIG. 6, the mirror cover 4 extends into a hollow space defined within the visor body 2 as the mirror cover 4 moves towards the opened position. In this connection, as shown in FIG. 2, a lower rail 21 and a parallel upper rail 22 are formed within the shell 2a of the visor body 2 in order to provide a slide guide for the mirror cover 4. As a result, the lower rail 21 and the upper rail 22 respectively slidably support the lower edge and the upper edge of the mirror cover 4.

The sun visor 1 further includes an electrical circuit for electrically connecting the lighting device 5 to a power source, such as a battery of a vehicle for example. The electrical circuit includes a first electrical circuit on the side of the support rod 7, a second electrical circuit on the side of the shell 2a, and lamp terminals 52 and 53 from the lighting device 5.

The first electrical circuit includes a pair of lead wires 72 and a connector 71. The lead wires 72 extend through the support rod 7 and have first ends extending within the vehicle cabin ceiling and second ends (i.e., opposite to the first ends) extending into the visor body 2. The connector 71 is connected to the first ends of the lead wires 72. The connector 71 is adapted to be connected to a mating connector (not shown) of an electrical wiring loom that is connected to a battery. The wiring loom extends along and within the vehicle cabin ceiling.

The second electrical circuit includes a pair of body side terminals, 25 and 26, and a pair of body side electrodes, 23 and 24, fixedly attached to the rear surface within the shell 2a. The body side terminals 25 and 26 are respectively connected to the second ends of the lead wires 72. The body terminals 23 and 24 are disposed between the lower and upper rails, 21 and 22, and extend substantially parallel to the sliding direction of the mirror cover 4. The body terminals 23 and 24 are spaced apart from each other by a predetermined distance in a direction perpendicular to the sliding direction and are designed to contact a cover electrode 41 mounted to a front surface of the mirror cover 4.

Figure 7:
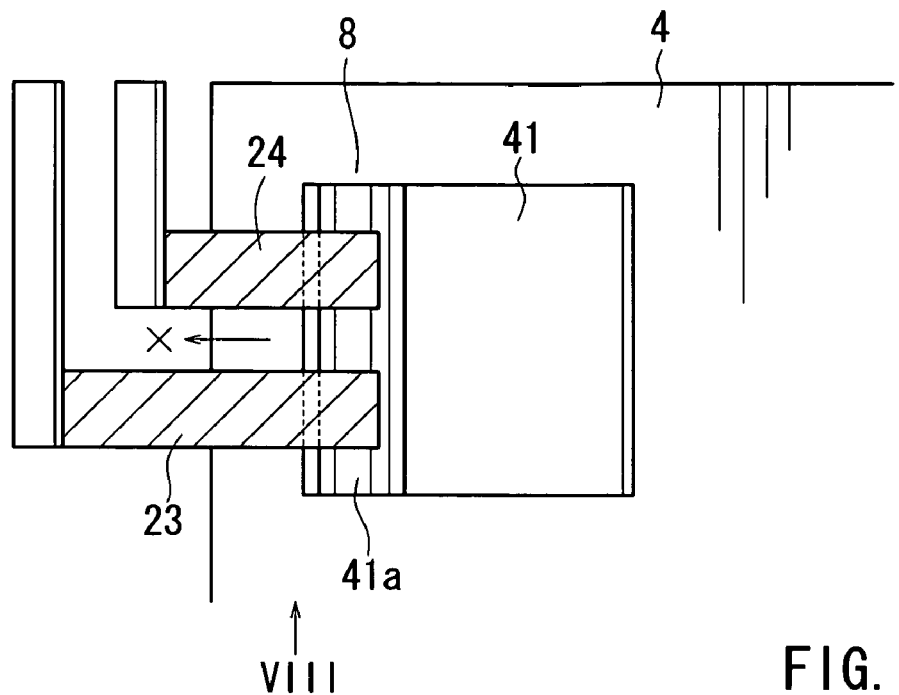
FIG. 7 is a front view of a light control device of the sun visor.
Figure 8:
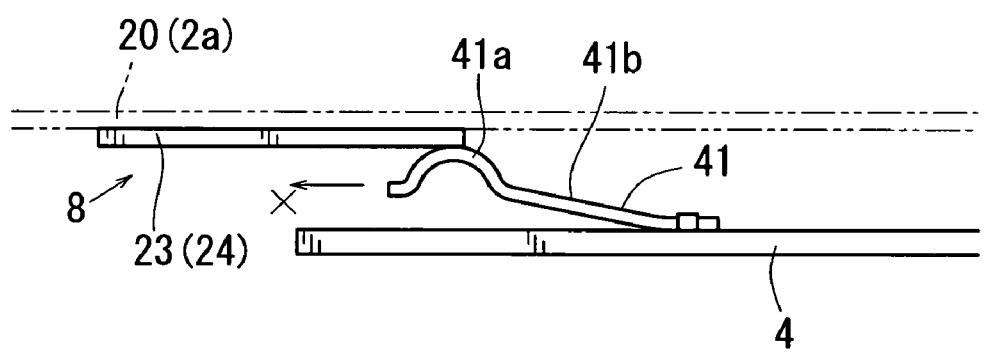
FIG. 8 is a bottom view of the light control device as viewed from a direction indicated by an arrow VIII in FIG. 7.

The body terminals 23 and 24 and the cover electrode 41 constitute a light control device 8. The cover electrode 41 is made of a leaf spring type of material and has a resilient portion 41b and a contact portion 41a, as shown in FIG. 8. The resilient portion 41b has one end secured to the front surface of the mirror cover 4 and extends toward the rear surface of the shell 2a. The contact portion 41a extends from the other end of the resilient portion 41b and is biased toward the rear surface of the mirror cover 4 (i.e., away from the mirror) by the resilient portion 41b. As a result, the contact portion 41a is resiliently pressed against the rear surface of the mirror cover 4. Therefore, the contact portion 41a serves to establish an electrical connection between the body electrodes 23 and 24 as shown in FIG. 7.

The body electrodes 23 and 24 are made of a material having a predetermined electrical resistance value. As the cover electrode 41 slides along the body electrodes 23 and 24, the contact position between the body electrodes 23 and 24 is changed so as to vary the resistance value generated by the circuit comprising the body electrodes 23 and 24 and the cover electrode 41. More specifically, the resistance value may be reduced as the cover electrode 41 moves along the body electrodes 23 and 24 from the first ends (i.e., the right ends as viewed in FIG. 7) of the body electrodes 23 and 24, towards the second ends (i.e., the left ends as viewed in FIG. 7). Thus, the resistance generated by the body electrodes 23 and 24 and the cover electrode 41, which constitute the light control device 8, may be reduced (and the intensity of the light may be correspondingly increased). In this way, the light control device 8 is configured as a variable resistor in which the body electrodes 23 and 24 constitute resistive elements and the cover electrode 41 constitutes a trimming element.

As shown in FIG. 2, the body electrode 23 is connected to the body terminal 25 via a lead wire 23a. The body electrode 24 is connected to the lamp terminal 52 via a lead wire 24a. The lamp terminals 52 and 53 are also made of a leaf spring type of material. The lamp terminals 52 and 53 resiliently hold opposite ends of the lamp 50 so as to be electrically connected thereto. The lamp terminal 53 is electrically connected to the body terminal 26 via a lead wire 53a.

Figure 4:
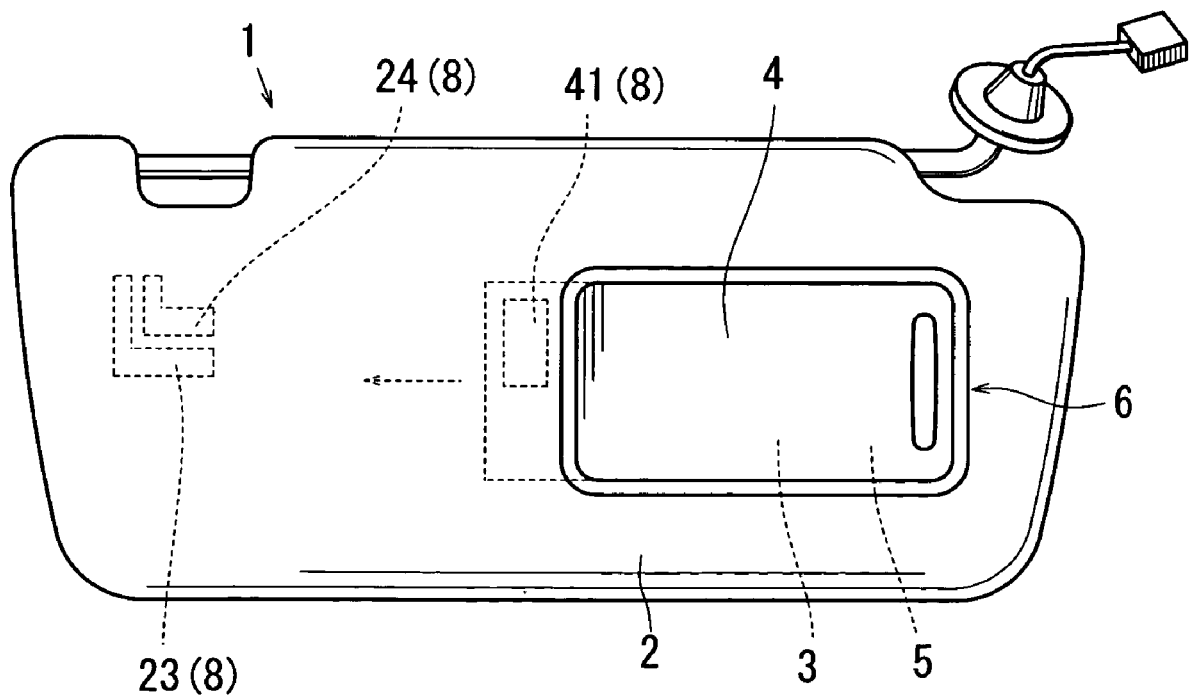
FIG. 4 is a front view of the sun visor with the mirror cover in a closed position.

The operation of the lighting device 8 will now be described. As shown in FIG. 4, the mirror cover 4 covers the lighting device 5 when the mirror cover 4 is in the closed position. In this situation, the cover electrode 41 is positioned away from the body electrodes 23 and 24. Therefore, the lighting device 5 is not electrically connected to the vehicle battery so that the lighting device 5 is off (i.e., not illuminated).

Figure 5:
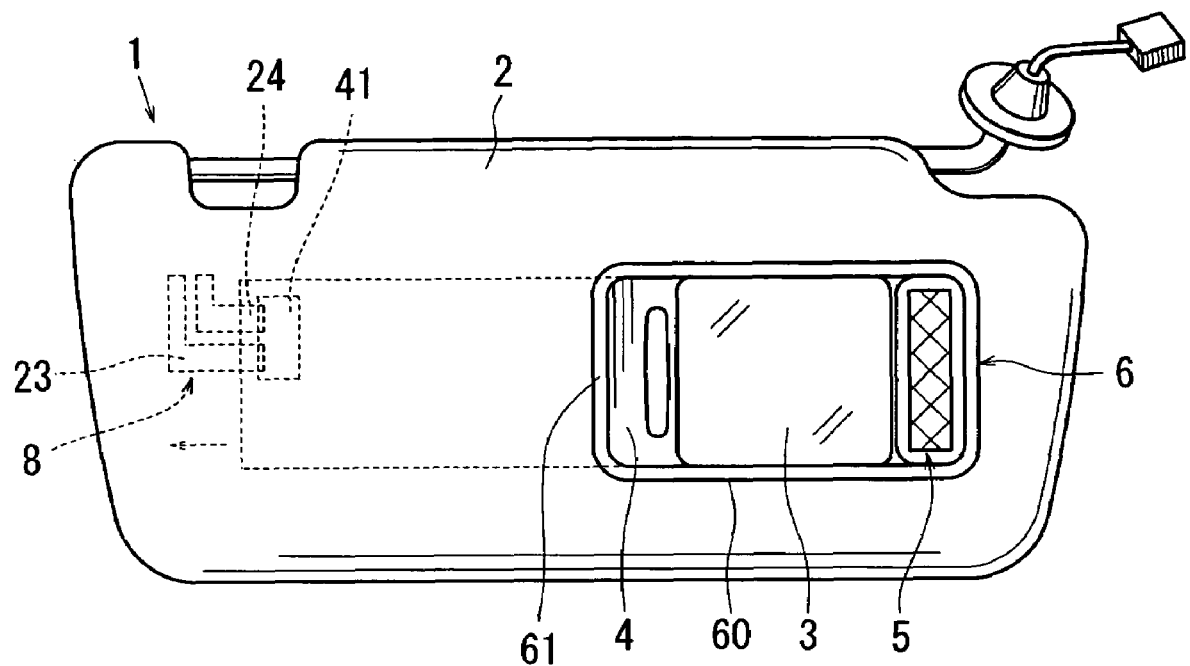
FIGS. 5 and 6 are front views of the sun visor similar to FIG. 4 but showing an intermediate opened position and a fully opened position of the mirror cover.

As the mirror cover 4 slides from the closed position toward the opened position as shown in FIG. 5, the lighting device 5 and the mirror 3 are uncovered (i.e., exposed) to the outside. At the same time, the cover electrode 41 contacts with the body electrodes 23 and 24 so that the body electrodes 23 and 24 are electrically connected. As a result, the electric power is supplied to the lighting device 5 so that the lighting device 5 is turned on (i.e., energized) so as to emit light. As the mirror cover 4 further moves from the position shown in FIG. 5 to the fully opened position shown in FIG. 6, the cover electrode 41 slides along the body electrodes 23 and 24 so that the resistance value provided by the light control device 8 may be gradually reduced. As a result, the power supplied to the lighting device 5 gradually increases to correspondingly increase the intensity of the light emitted from the lighting device 5.

Figure 10:
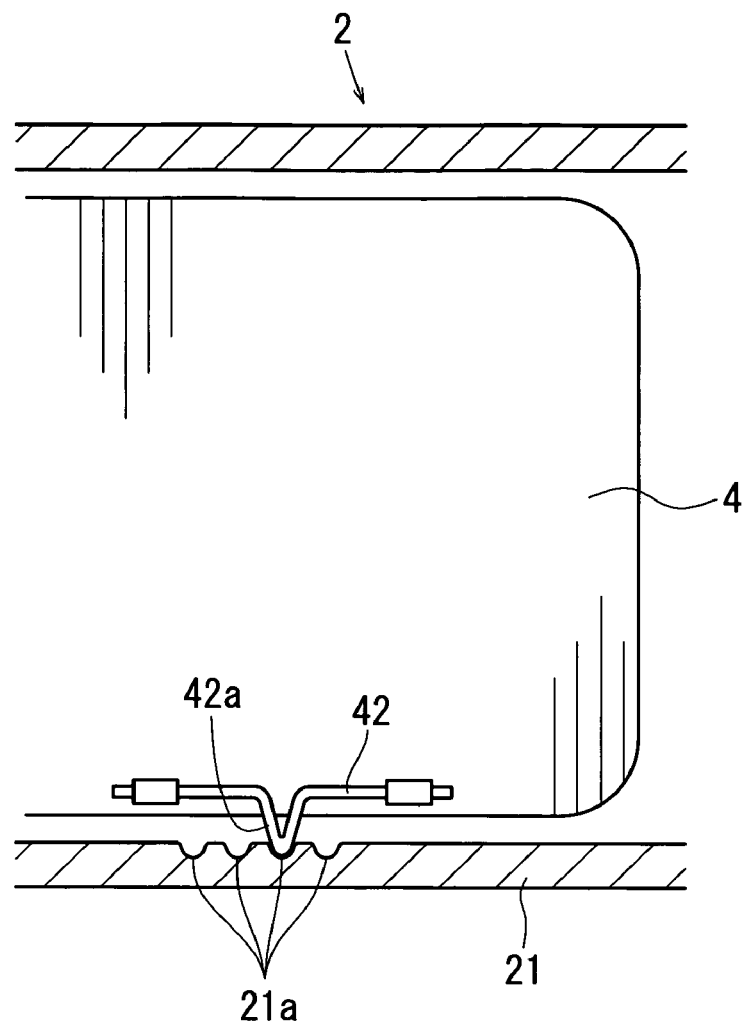
FIG. 10 is a rear view of a positioning device of the sun visor.

Referring to FIG. 10, a positioning device is disposed between the mirror cover 4 and the visor body 2 in order to enable the positioning of the mirror cover 4 at a plurality of set positions along the sliding direction. As shown in FIG. 10, the positioning device may include a resilient member 42 mounted to the rear surface of the mirror cover 4 and a plurality of engaging portions 21a formed on the lower rail 21 of the visor body 2. The resilient member 42 may be made of a wire spring material and have a projection 42a extending downward beyond the lower edge of the mirror cover 4. The engaging portions 21a are configured as parallel recesses formed in the upper edge of the rail 21 and arranged in the right and left directions. Therefore, the mirror cover 4 may be positioned at plural locations between the position shown in FIG. 5 (e.g., initial contact, low intensity light) and the position shown in FIG. 6 (e.g., full contact, high intensity light) by using the position device. With this positioning of the mirror cover 4, the intensity of the light emitted from the lighting device 5 can be selectively fixed to a desired intensity corresponding to one of the settable positions.

According to the first representative embodiment described above, the light control device 8 of the sun visor 1 serves as an ON/OFF switch of the lighting device 5 and also serves as a switch for controlling the intensity of light. Since the light control device 8 functions as multiple types of switches, the sun visor 1 may be simple in construction. In addition, in response to the sliding movement of the mirror cover 4, the light control device 8 functions to turn on and off the lighting device 5 and to vary the intensity of light emitted from the lighting device 5. Therefore, it is not necessary to perform separate operations for turning on and off the lighting device 5 and for varying the light intensity. As a result, the overall operability may be improved.

Further, as shown in FIG. 8, the light control device 8 is configured as a variable resistor constituted by a pair of body electrodes 23 and 24, and the cover electrode 41, which moves together with the mirror cover 4. As a result, the light control device 8 has a simple construction. Furthermore, the positioning device may be provided between the mirror cover 4 and the visor body 2. The lighting device 5 can be easily positioned to emit the desired intensity of light. In addition, the positioning device can reliably maintain the set level of intensity. The lighting device 5 may be improved in operability in this respect.

Second to sixth representative embodiments will now be described with reference to FIGS. 11 to 18. These representative embodiments are modifications of the first representative embodiment. Therefore, in FIGS. 11 to 18, like members are given the same reference numerals as in the first representative embodiment and the description of these members may not be repeated.

SECOND REPRESENTATIVE EMBODIMENT

Figure 11:
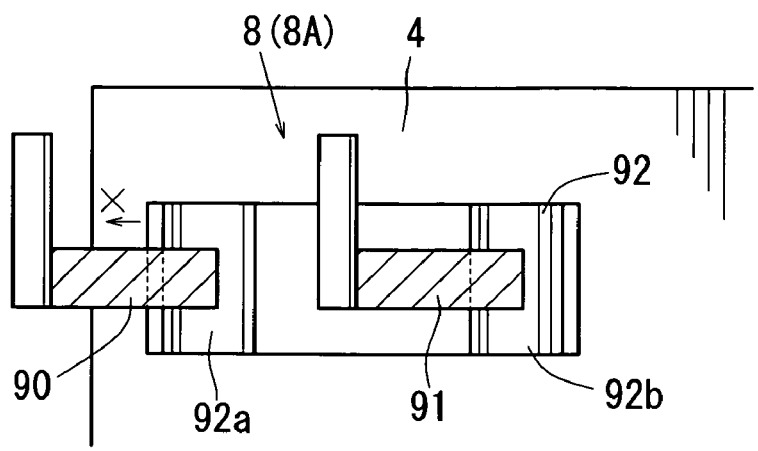
FIGS. 11 and 12 are a front view and a bottom view of a light control device according to the second representative embodiment.

The second representative embodiment will now be described with reference to FIGS. 11 and 12. The second representative embodiment is different from the first representative embodiment in the construction of the light control device 8. In other respects, the second representative embodiment is the same as the first representative embodiment.

Figure 12:
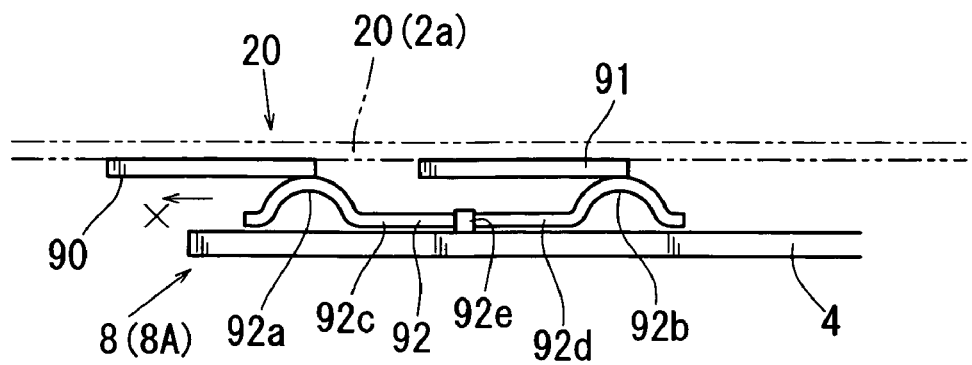

Referring to FIG. 12, a light control device 8A has a pair of body electrodes, 90 and 91, mounted to the rear surface of the shell 2a, and a cover electrode 92 mounted to the mirror cover 4. The body electrodes 90 and 91 are aligned with each other in the sliding direction of the mirror cover 4 and are spaced apart from each other in the sliding direction. The cover electrode 92 is made of a leaf spring type of material for example and extends along the sliding direction. The cover electrode 92 has a central mount portion 92e secured to the mirror cover 4. In addition, the cover electrode 92 has two resilient portions 92c and 92d and contact portions 92a and 92b respectively disposed on either side of the mount portion 92e.

Figure 9:
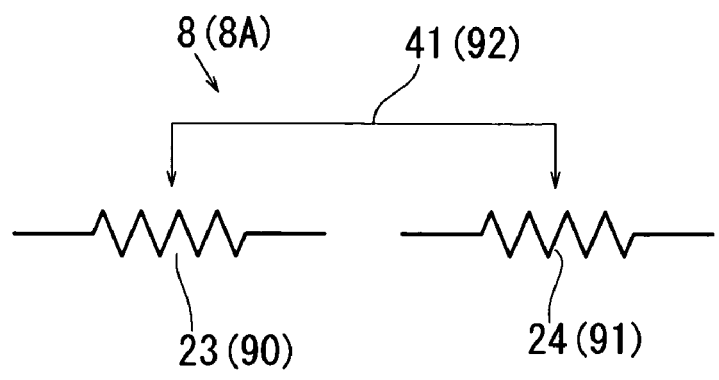
FIG. 9 is a schematic configuration of an electrical circuit of a light control device according to the first and second representative embodiments.

The resilient portions 92c and 92d extend from the mount portion 92e towards the shell 2a in order to respectively bias the contact portions 92a and 92b towards the shell 2a. Therefore, the contact portions 92a and 92b may move together with the mirror cover 4 to respectively resiliently contact the body electrodes 90 and 91 in order to establish an electrical connection between the body electrodes 90 and 91 (see FIG. 11). As the cover electrode 92 moves together with the mirror cover 4 along the body electrodes 90 and 91, the electrical contact position between the body electrodes 90 and 91 may be varied. Consequently, the resistance value given by the light control device 8A may be varied. In this way, similar to the first representative embodiment, the light control device 8A is configured as a variable resistor in which the body electrodes 90 and 91 serve as the resistive elements and the cover electrode 92 serves as a trimming element, as shown in FIG. 9.

THIRD REPRESENTATIVE EMBODIMENT

The third representative embodiment will now be described with reference to FIGS. 13 and 14. The third representative embodiment is different from the first representative embodiment in the construction of the light control device 8. In other respects, the third representative embodiment is the same as the first representative embodiment.

Figure 13:
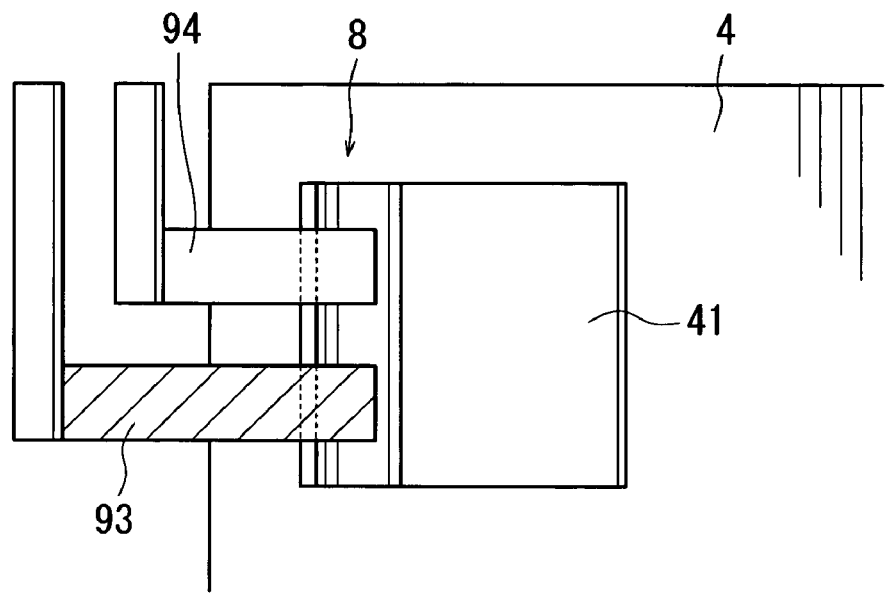
FIG. 13 is a front view of a lighting device according to a third representative embodiment.
Figure 14:
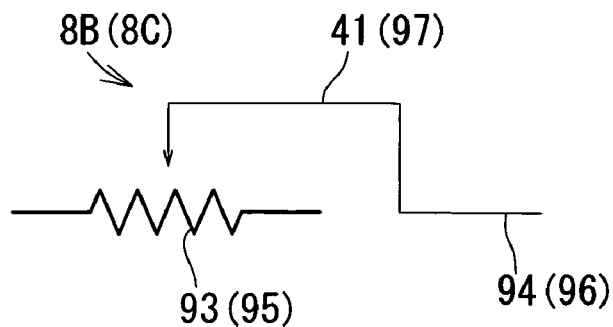
FIG. 14 is a schematic configuration of an electrical circuit of a light control device according to the third and fourth representative embodiments.

Referring to FIG. 13, a light control device 8B has a pair of body electrodes, 93 and 94, mounted to the rear surface of the shell 2a, and a cover electrode 41 mounted to the mirror cover 4. The body electrodes 93 and 94 extend parallel to each other in the sliding direction of the mirror cover 4 in the same manner as the body electrodes 23 and 24 of the first representative embodiment. However, one of the body electrodes, the body electrode 94 for example, is made of a material having a small electrical resistance that is negligible in comparison with a predetermined electrical resistance given by the material of the other body electrode, body electrode 93. Therefore, in this representative embodiment, the light control device 8B is configured as a variable resistor in which a single body electrode 93 serves as a resistive element and the cover electrode 41 serves as a trimming element, as shown in FIG. 14.

With this configuration of the light control device 8B, the sliding distance of the mirror cover 4 required for varying the electrical resistance by a desired value is greater than the sliding distance of the mirror cover 4 required for varying the electrical resistance by the same value in the light control device 8 of the first representative embodiment. As a result, it is possible to more easily make fine adjustments or settings of the light intensity.

FOURTH REPRESENTATIVE EMBODIMENT

The fourth representative embodiment will now be described with reference to FIG. 15. The fourth representative embodiment is a further modification of the second representative embodiment and differs from the second representative embodiment in the construction of the light control device 8A. In other respects, the fourth representative embodiment is the same as the second representative embodiment.

Figure 15:
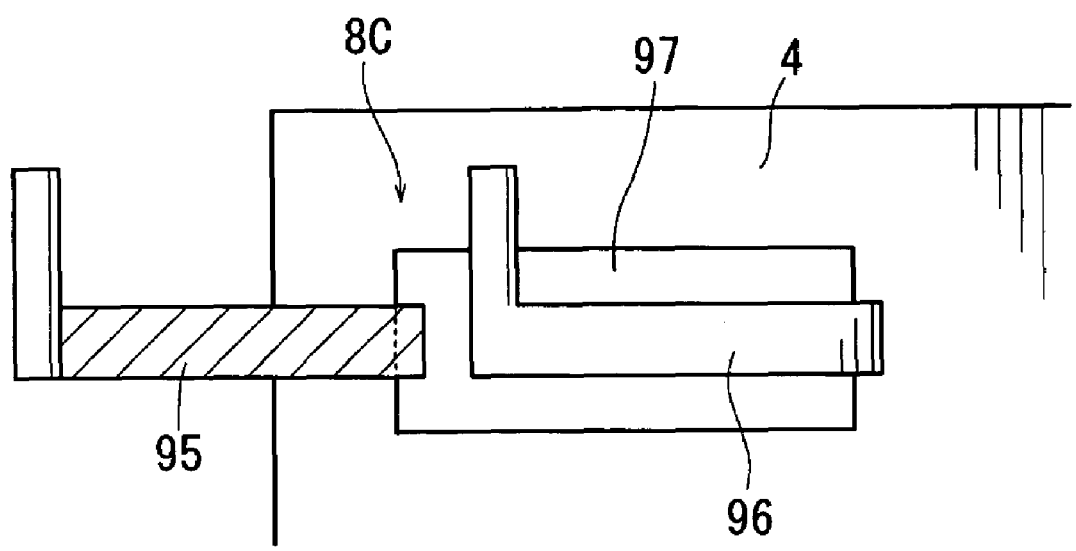
FIG. 15 is a front view of the light control device according to a fourth representative embodiment.

Referring to FIG. 15, a light control device 8C has a pair of body electrodes 95 and 96 mounted to the rear surface of the shell 2a, and a cover electrode 97 mounted to the mirror cover 4. The cover electrode 97 is configured the same as the cover electrode 92 of the second representative embodiment (see FIG. 12). The body electrodes 95 and 96 are aligned with each other in the sliding direction of the mirror cover 4 and are spaced apart from each other in the sliding direction. However, similar to the third representative embodiment, the body electrode 96 is made of a material having a small electrical resistance that is negligible in comparison with the predetermined electrical resistance provided by the material of the body electrode 95. Therefore, in this representative embodiment, the light control device 8C is configured as a variable resistor in which a single body electrode 95 serves as a resistive element and the cover electrode 97 serves as a trimming element, as shown in FIG. 14.

FIFTH REPRESENTATIVE EMBODIMENT

The fifth representative embodiment will now be described with reference to FIG. 16. The fifth representative embodiment is a modification of the first representative embodiment and differs from the first representative embodiment in the arrangement of the lighting device 5 and the mirror unit 6. In other respects, the fifth representative embodiment is the same as the first representative embodiment.

Figure 16:
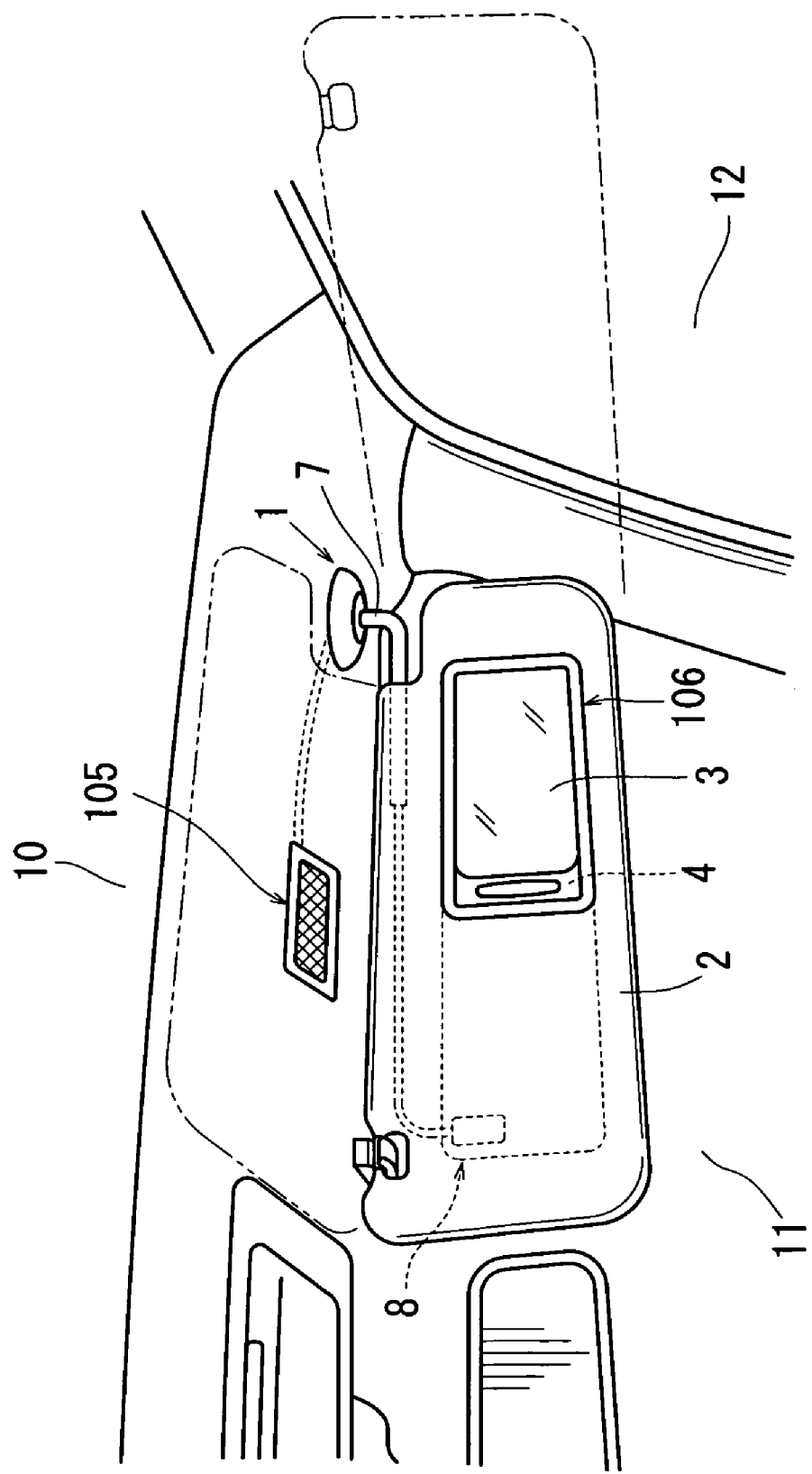
FIG. 16 is a perspective view of a vehicle sun visor according to a fifth representative embodiment of the present invention and showing a configuration where a visor body and a lighting device are separately mounted to a vehicle cabin ceiling.

Referring to FIG. 16, the sun visor 1 includes a mirror unit 106 and a lighting device 105 that are separated from each other. The mirror unit 106 has a mirror 3 and a mirror cover 4 but does not include a lighting device attached to the mirror unit 106. The lighting device 105 is mounted to the vehicle cabin ceiling 10. The lighting device 105 is positioned within a region that is covered by the visor body 2 when the visor body 2 is located in a storage position along the vehicle cabin ceiling 10. In the same manner as in the first representative embodiment, the light control device 8 is disposed between the mirror cover 4 and the visor body 2.

The light control device 8 functions to turn the lighting device 105 on and off and to vary the intensity of the light emitted from the lighting device 105 once the lighting device 105 has been switched on.

SIXTH REPRESENTATIVE EMBODIMENT

The sixth representative embodiment will now be described with reference to FIGS. 17 and 18. The sixth representative embodiment is a modification of the first representative embodiment and differs from the first representative embodiment in the configuration and the arrangement of the light control device 8. In other respects, the sixth representative embodiment is the same as the first representative embodiment.

Figure 17:
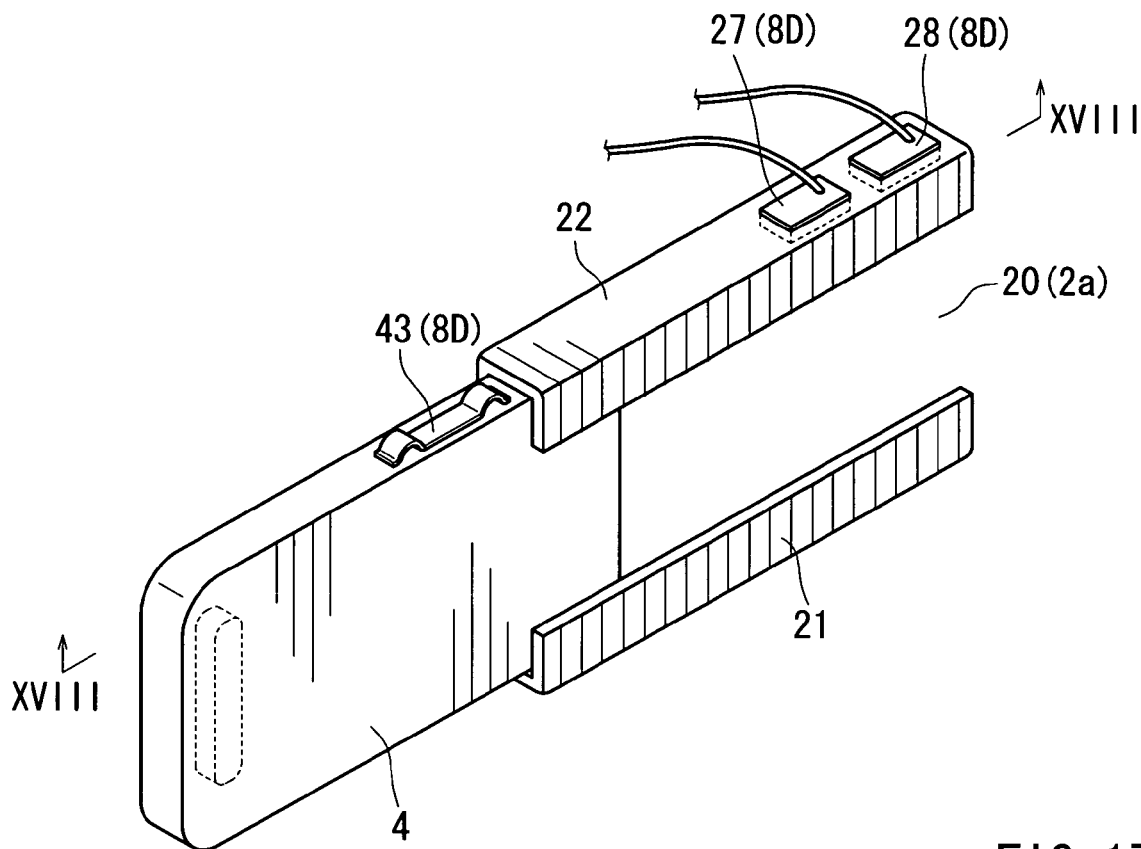
FIG. 17 is a perspective view of a light control device according to a sixth representative embodiment and showing the light control device together with a mirror cover and rails.

Referring to FIG. 17, a lighting device 8D includes a cover electrode 43 and a pair of body electrodes, 27 and 28. The cover electrode 43 is mounted to an edge of the mirror cover 4 (e.g., the upper edge in this embodiment). The body electrodes 27 and 28 are mounted to a corresponding rail, for example, the upper rail 22.

In this representative embodiment, in the same manner as in the first representative embodiment (see FIG. 2), the lower and upper rails 21 and 22 are formed on the shell 2a of the visor body 2 in order to provide a guide for the mirror cover 4. Thus, the lower rail 21 slidably supports the lower edge of the mirror cover 4. Conversely, the upper rail 22 slidably supports the upper edge of the mirror cover 4.

The material of each of the body electrodes 27 and 28 may have a predetermined resistance value. Alternatively, the material of one of the body electrodes 27 and 28 may have a predetermined resistance value and the material of the other of the body electrodes 28 and 27 may have a small and negligible resistance value.

Figure 18:
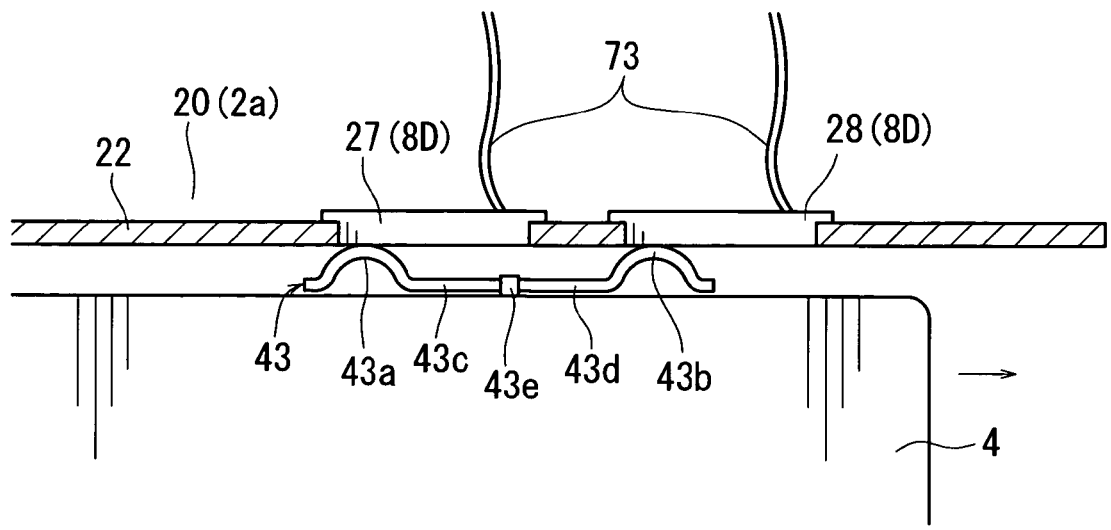
FIG. 18 is a sectional view taken along line XVIII-XVIII in FIG. 17 and showing the state where a cover electrode electrically connects the body electrodes.

As shown in FIG. 18, the body electrodes 27 and 28 are mounted to the rail 22 to extend throughout the thickness of the rail 22. The body electrodes 27 and 28 are spaced apart from each other in the sliding direction of the mirror cover 4. Lead wires 73 are respectively connected to the body electrodes 27 and 28 so that the body electrodes 27 and 28 are respectively connected to the body terminal 25 and the lamp terminal 52 (see FIG. 2) via corresponding lead wires 73.

The cover electrode 43 is made of leaf spring type of material and extends along the upper edge of the mirror cover 4. As shown in FIG. 18, the cover electrode 43 has a central mount portion 43e and a pair of resilient portions 43c and 43d. Two contact portions 43a and 43b are disposed on either side of the central mount portion 43e. The resilient portions 43c and 43d extend towards the rail 22 and respectively bias the contact portions 43a and 43b towards the rail 22. The contact portions 43a and 43b may respectively contact the body electrodes 27 and 28 when the mirror cover 4 slides rightward as viewed in FIG. 17 (i.e., towards the opened position). As a result, the cover electrode 43 may establish an electrical circuit between the body electrodes 27 and 28.

With this arrangement, as the mirror cover 4 slides, the cover electrode 43 may also slide along and establish contact with the body electrodes 27 and 28 so as to electrically connect the body electrodes 27 and 28 and to vary the position of the electrical contact points. Therefore, the light control device 8D including the body electrodes 27 and 28 and the cover electrode 43 may be configured as a variable resistor similar to that shown in FIG. 9 or that shown in FIG. 14.

According to the sixth representative embodiment, the cover electrode 43 mounted to the mirror cover 4 moves relative to the body electrodes 27 and 28 that are mounted to the rail 22, along which slides the mirror cover 4. Therefore, the cover electrode 43 can reliably contact the body electrodes 27 and 28 in order to establish an electrical circuit therebetween.

OTHER POSSIBLE EMBODIMENTS

The present invention may not be limited to the first to sixth representative embodiments described above, but may be modified in various ways as follows:

(1) The elements of the first to sixth representative embodiments may be selectively combined to configure other embodiments.

(2) The lighting device may be positioned at any other position than those disclosed in the first to sixth representative embodiments, as long as the lighting device can be used for illuminating the operator (typically the user) of the mirror, e.g., the driver or the passenger. For example, the lighting device may be mounted to one of the pillars of the vehicle.

(3) Two cover electrodes mounted to the mirror cover and a body electrode mounted to the visor body may constitute the light control device. In this connection, one or both of the cover electrodes may be made of a material having a predetermined resistance value such that the body electrode serves to establish an electrical circuit between the cover electrodes in the form of a variable resistor.

(4) A sensor may be provided on the mirror cover or the visor body in order to detect the position of the mirror cover. The sensor may be connected to a switch that turns the lighting device on and off based upon a detection signal supplied from the sensor.

The invention claimed is:

1. A vehicle sun visor comprising:
   a visor body,
   a mirror mounted to the visor body,
   a mirror cover slidably movable relative to the visor body along a reflective surface of the mirror,
      wherein the mirror cover slides between a closed position substantially covering the reflective surface of the mirror and an opened position uncovering the reflective surface; and
   a lighting device arranged and constructed to illuminate an operator of the mirror cover,
   a light control device arranged and constructed so as to switch the lighting device from off to on at a predetermined point as the mirror cover slides from the closed position to the opened position, and
   wherein the light control device is arranged and constructed to also control an intensity of light emitted from the lighting device in response to the position of the mirror cover, and wherein the light control device comprises:
      two body electrodes mounted to the visor body, and
      a cover electrode mounted to the mirror cover,
      wherein the cover electrode moves together with the mirror cover,
      wherein the light control device is configured as a variable resistor and is operable to establish an electrical connection between the body electrodes by the cover electrode in response to the movement of the sliding mirror cover, and
      wherein the light control device is operable to vary an electrical resistance value as the cover electrode slides along the body electrodes while the body electrodes are electrically connected by the cover electrode.

2. The vehicle sun visor as in claim 1, further comprising at least one rail arranged and constructed to provide a guide for the sliding movement of the mirror cover, and
wherein the body electrodes are mounted to the at least one rail.

3. The vehicle sun visor as in claim 1, further comprising a positioning device disposed between the mirror cover and the visor body,
wherein the positioning device is arranged and constructed to enable the sliding position of the visor cover to be selectively set to one of a plurality of set positions.

4. A vehicle sun visor comprising:
a visor body; and
a mirror mounted to the visor body, and
a mirror cover mounted to the visor body and movable between a closed position covering a reflective surface of the mirror and an opened position substantially uncovering the reflective surface via an intermediate position between the closed position and the opened position; and
a lighting device arranged and constructed to emit light; and
a light control device arranged and constructed to control the light emitted from the lighting device so that the light intensity increases from the intermediate position as the mirror cover moves from the closed position to the opened position,
wherein the light control device is further arranged and constructed to maintain the light intensity to substantially zero during the movement of the mirror cover between the closed position and the intermediate position and to gradually increase the light intensity as the mirror cover moves from the intermediate position to the opened position.

5. The vehicle sun visor as in claim 4,
wherein the visor body comprises a linear guide device arranged and constructed to support the mirror cover so that the mirror cover moves between the closed position and the opened position along a substantially linear path.

6. The vehicle sun visor as in claim 4, further comprising a positioning device arranged and constructed to releasably hold the mirror cover in a selected position at one of plural positions between the closed position and the opened position.

7. A vehicle sun visor comprising:
a visor body; and
a mirror mounted to the visor body, and
a mirror cover mounted to the visor body and movable between a closed position for covering a reflective surface of the mirror and an opened position for substantially uncovering the reflective surface, and
a lighting device arranged and constructed to emit light; and
a light control device electrically connected to the lighting device in order to control an intensity of light emitted from the lighting device;
wherein the light control device comprises a variable resistor arranged and constructed to vary a resistance value of a lighting circuit in response to at least a part of the movement of the mirror cover between the closed position and the opened position, and
wherein the variable resistor comprises a pair of first electrodes mounted to one of the visor body or the mirror and a second electrode mounted to the other of the visor body or the mirror,
wherein the pair of first electrodes and the second electrode are positioned to extend in the moving direction of the mirror cover so that the second electrode contacts the pair of the first electrodes in order to establish an electrical connection between the first electrodes, and
wherein moving the second electrode relative to the pair of first electrodes varies the resistance value of the lighting circuit.

8. The vehicle sun visor as in claim 7,
wherein the mirror cover moves along a linear path between the opened position and the closed position, and
wherein the pair of first electrodes and the second electrode extend substantially parallel to linear path.

9. The vehicle sun visor as in claim 8,
wherein the second electrode has a contact surface for establishing an electrical connection between the pair of first electrodes from at least a point as the mirror cover moves from the closed position to the opened position.

10. The vehicle sun visor as in claim 8,
wherein the first electrodes are positioned to be spaced from each other in a direction parallel to the linear path; and
wherein the second electrode comprises a first contact surface and a second contact surface for providing an electrical connection between the pair of first electrodes from at least a point as the mirror cover moves from the close position to the open position.

11. The vehicle sun visor as in claim 8,
wherein the second electrode is mounted to a surface of the mirror cover opposing the visor body, and
wherein the pair of first electrodes are mounted to the visor body in positions opposing to the second electrode when the mirror cover is at least in the opened position.

12. The vehicle sun visor as in claim 8,
wherein one of the pair of first electrodes has an electrical resistance that is negligibly small in comparison with an electrical resistance of the other of the pair of first electrodes.

13. The vehicle suns visor as in claim 8,
further comprising a pair of guide rails mounted to the visor body in order to provide a guide for movement of the mirror cover along the linear path, and
wherein the pair of first electrodes are mounted to one of the guide rails, and
wherein the second electrode is mounted to an edge portion of the mirror cover opposing the one of the guide rails.

* * * * *